(12) United States Patent
Kubokawa et al.

(10) Patent No.: US 7,900,742 B2
(45) Date of Patent: Mar. 8, 2011

(54) VEHICLE STEERING CONTROL

(75) Inventors: Noriki Kubokawa, Zama (JP); Takaaki Eguchi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 608 days.

(21) Appl. No.: 11/633,646

(22) Filed: Dec. 5, 2006

(65) Prior Publication Data
US 2007/0131476 A1    Jun. 14, 2007

(30) Foreign Application Priority Data
Dec. 9, 2005  (JP) ................... 2005-355591

(51) Int. Cl.
*B62D 5/04* (2006.01)

(52) U.S. Cl. .......... 180/402; 180/407; 180/444; 180/446

(58) Field of Classification Search ............... 180/402, 180/403, 405, 407, 443, 444, 446
See application file for complete search history.

(56) References Cited

U.S. PATENT DOCUMENTS

| | | | |
|---|---|---|---|
| 6,219,604 B1 | 4/2001 | Dilger et al. | |
| 6,345,681 B1 * | 2/2002 | Hackl et al. | 180/402 |
| 7,174,987 B2 * | 2/2007 | Husain | 180/402 |
| 7,533,757 B2 * | 5/2009 | Sugitani et al. | 180/402 |
| 2003/0141134 A1 | 7/2003 | Sherwin et al. | |
| 2004/0238257 A1 * | 12/2004 | Takahashi et al. | 180/402 |
| 2005/0045413 A1 * | 3/2005 | Shitamitsu et al. | 180/402 |
| 2005/0279562 A1 * | 12/2005 | Hara et al. | 180/402 |
| 2006/0042858 A1 * | 3/2006 | Boyle et al. | 180/402 |

FOREIGN PATENT DOCUMENTS

| | | |
|---|---|---|
| EP | 1205371 | * 11/2001 |
| EP | 1407959 A2 | 4/2004 |
| EP | 1676767 A2 | 7/2006 |
| JP | 2002-145098 | 5/2002 |

* cited by examiner

*Primary Examiner* — Anne Marie M Boehler
(74) *Attorney, Agent, or Firm* — Global IP Counselors, LLP

(57) ABSTRACT

A steer-by-wire system is provided with a driver operating unit, a turning unit, a backup mechanism, a steering reaction actuator, a wheel turning actuator and a controller. The backup mechanism mechanically connects the driver operating unit to the turning unit via a first shaft to transmit an input torque from the driver operating unit to the turning unit when the driver operating unit and the turning unit are mechanically connected by the backup mechanism. The steering reaction actuator applies a steering reaction torque to the driver operating unit. The wheel turning actuator applies a wheel turning torque to the turning unit via a second shaft. The controller controls the wheel turning actuator and the steering reaction actuator. The controller is configured to control the steering reaction actuator based on an operating parameter of the wheel turning actuator.

16 Claims, 4 Drawing Sheets

VEHICLE STEERING CONTROL

CROSS REFERENCE TO RELATED APPLICATION

This application claims priority from Japanese Patent Application Serial No. 2005-355591, filed 9th Dec. 2005, the entire contents of which are expressly incorporated herein by reference.

BACKGROUND OF THE INVENTION

1. Field of the Invention

The present invention relates to vehicle steering control and particularly, but not exclusively, to a steering control apparatus for a vehicle employing a steer-by-wire system in which a steering portion and a steered portion are, during normal use, mechanically disconnected but can be connected mechanically by means of a backup mechanism, such as a clutch, in the event of malfunction. Aspects of the invention also relate to a system, to a controller, to a method and to a vehicle.

2. Background Information

It is known, for example from Japanese Kokai Patent Application No. 2002-145098, to provide a steering control system for a vehicle which is configured to control a steering reaction actuator for the purpose of providing road surface information pertaining to contact between a road surface and the vehicle tires to the driver via the vehicle steering wheel. In this known system, primary and secondary actuators are serially connected to a steering rack and arranged to steer the vehicle wheels by applying a wheel turning torque or force to the steering rack. The actuators are mechanically linked to a backup mechanism in order to provide reliable steering in the event of an accident or a failure of one of the motors. A steering reaction torque for performing steering reaction control is calculated based on a steering angle of the steering rack as measured by a sensor and is used to control the steering reaction actuator thereby to provide steering feedback to the driver.

SUMMARY OF THE INVENTION

It has been identified that this known system suffers from the problem that, since the steering angle, on which the steering reaction torque is based, is not substantially affected by adverse loading conditions, for example bumps, pot-holes or other road surface intrusions, then it is difficult to effect optimum steering reaction control.

One object of the present invention to address this problem and to improve upon known technology. Embodiments of the present invention may permit fluctuations in steering reaction torque applied to the steering wheel to be reduced or substantially eliminated, thereby reducing an unpleasant sensation created for the driver. Other aims and advantages of the invention will become apparent from the following description, claims and drawings.

To attain the above mentioned object of the present invention, a steering apparatus for a vehicle having at least one steered wheel in which the steering apparatus comprises a driver operating unit, a turning unit, a backup mechanism, a steering reaction actuator, a wheel turning actuator and a controller. The backup mechanism is selectively operable to mechanically connect the driver operating unit to the turning unit via a first shaft to transmit an input torque from the driver operating unit to the turning unit when the driver operating unit and the turning unit are mechanically connected. The steering reaction actuator is operable to apply a steering reaction torque to the driver operating unit. The wheel turning actuator is operable to apply a wheel turning torque to the turning unit via a second shaft. The controller is operable to control the wheel turning actuator and the steering reaction actuator. The controller is configured to control the steering reaction actuator based on an operating parameter of the wheel turning actuator.

Within the scope of this application it is envisaged that the various aspects, embodiments and alternatives set out in the preceding paragraphs, in the claims and in the following description may be taken individually or in any combination thereof.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Figure 1:
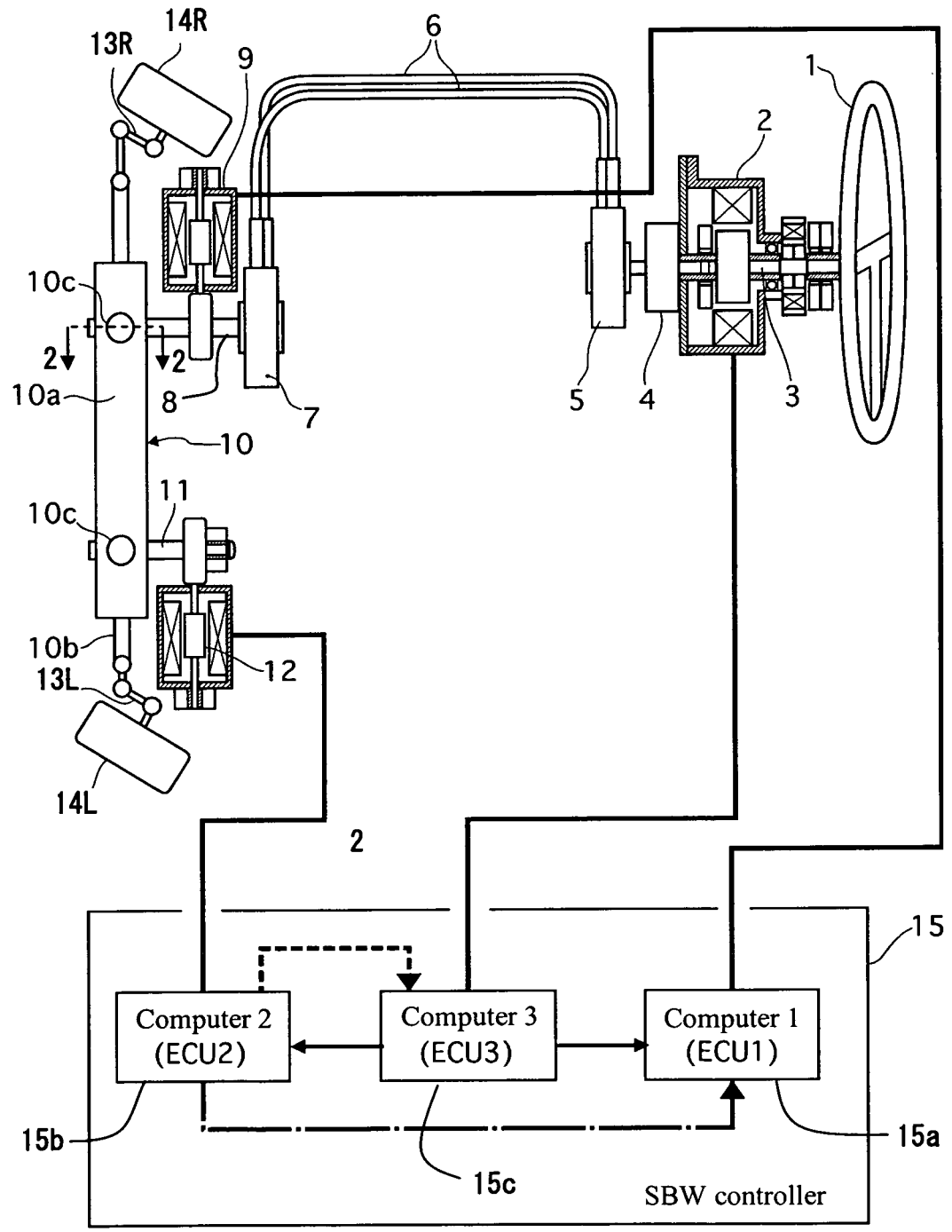
FIG. 1 is a simplified schematic diagram of a steer-by-wire system in accordance with one embodiment of the present invention.
Figure 2:
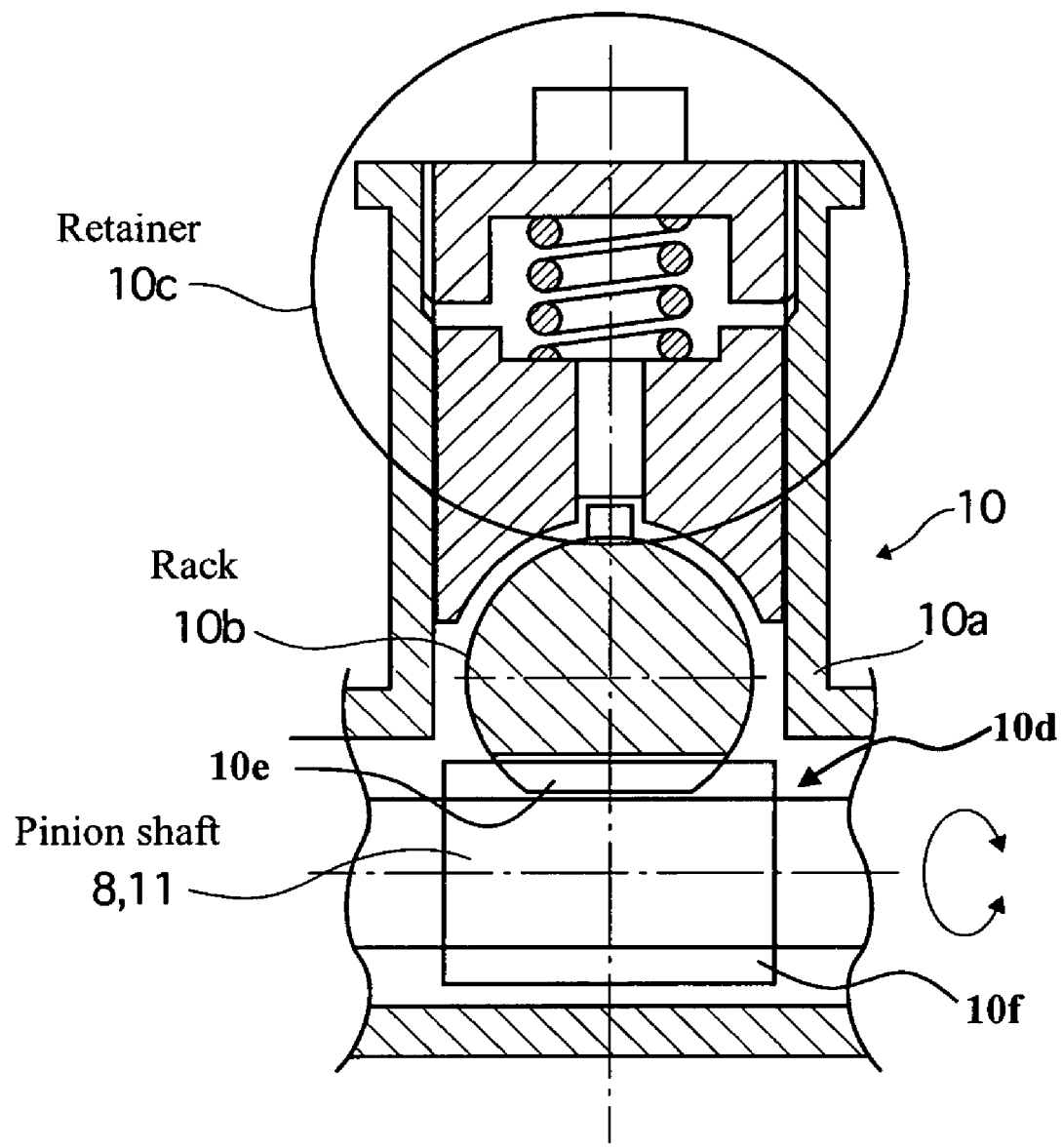
FIG. 2 is a partial cross sectional view of a retainer part of a steering rack and pinion gear mechanism as seen along section line 2-2 in FIG. 1.

Referring to FIGS. 1 and 2, a steer-by-wire (SBW) system basically includes a steering portion in the form of a driver operating unit including a steering wheel 1 for inputting a steering torque applied by a vehicle driver. The steering wheel 1 is connected to a steering reaction actuator in the form of a motor 2 by a steering column shaft 3.

The SBW system also includes a backup mechanism with a clutch 4 being mounted on the steering column shaft 3 to selectively engage and disengage the driver operating unit (steering portion) with/from the backup mechanism. The backup mechanism basically includes a first cable pulley 5, a pair of backup cables 6 and a second cable pulley 7. The backup cables 6 are wound around both the first and second cable pulleys 5 and 7 and sit in a grooved formed in each.

The SBW system also includes a steered portion in the form of a turning unit that basically includes a right pinion shaft 8, a right motor 9, a steering rack and pinion gear mechanism 10, a left pinion shaft 11 and a left motor 12. The steering rack and pinion gear mechanism 10 basically includes a steering rack case 10a, a steering rack 10b, a pair of retainers 10c, a pair of pinions 10d (only one shown in FIG. 2), a steering rack gear 10e and a pair of pinion gears 10f (only one shown in FIG. 2). The right motor 9 forms a first wheel turning actuator, while the left motor 12 forms a second wheel turning actuator. The motors 9 and 12 are mechanically connected to respective ends of the steering rack 10b. The left end of the steering rack 10b is provided with a tie rod 13L, while the right end of the steering rack 10b is provided with a tie rod 13R. Left and right steered wheels 14L and 14R are connected in a conventional manner to the steering rack 10b via the tie rods 13L and 13R, respectively.

The first motor 9 is connected to the steering rack 10b via the first pinion shaft 8 on which is mounted a first one of the pinion gears 10f (FIG. 2). This arrangement is configured such that a torque generated by the first motor 9 is transmitted to the steering rack 10b via the first or right pinion shaft 8 and one of the pinion gears 10f. In a similar manner, the second motor 12 is connected to the steering rack 10b via the second or left pinion shaft 110n which is mounted one of the pinion gears 10f. This arrangement is configured such that a torque generated by the second motor 12 is transmitted to the steering rack 10b via the second pinion shaft 11 and one of the pinion gears 10f.

As shown in FIG. 2, a cross section of the rack and pinion gear mechanism 10 is illustrated as viewed along the line 2-2 in FIG. 1. The steering rack 10b is biased by the retainers 10c, which are disposed at or close to opposite ends of the steering rack case 10a in which the steering rack 10b is housed. The steering rack 10b is installed in a lateral or widthwise direction of the vehicle. The pinion 10d on the first pinion shaft 8 is installed in a longitudinal or fore/aft direction of vehicle and carries one of the pinion gears 10f, which is arranged to engage with the steering rack gear 10e carried on the steering rack 10b. The first motor 9 is connected to the second pinion shaft 8 via a first worm and worm wheel (not numbered).

Likewise, although not shown in FIG. 2, another pinion is disposed in a longitudinal or fore/aft direction of the vehicle adjacent the opposite end of the steering rack 10b. This pinion carries one of the pinion gears 10f and forms part of the second pinion shaft 11. The second pinion shaft 11 is coupled to the second motor 12 via a second worm and worm wheel (not numbered).

It will be understood from the foregoing that the pinion shafts 8 and 11 are connected to the steering rack 10b in parallel with one another and at or adjacent opposite ends of the steering rack 10b.

The SBW system also includes control system in the form of a controller 15. The controller 15 comprises three computers or electronic control units (ECUs) 15a-15c. The ECU 15a-15c are connected to a respective one of the first motor 9, the second motor 12 and the steering reaction actuator 2 and arranged to control the operation thereof.

The SBW system of FIG. 1 is configured to operate in one of several modes (a normal SBW operation mode, a so-called partial failure mode and a backup mode). In particularly, the normal SBW operation mode is performed when steer-by-wire control is operated normally. The so-called partial failure mode is performed when one of the motors 9 and 12 has suffered a failure. The backup mode is performed when steering of the steered wheels is operated mechanically. These modes of operation are described in detail below.

During the normal SBW mode, the clutch 4 is disengaged such that the steering portion (e.g., the steering wheel 1, the steering reaction actuator 2 and the steering column shaft 3) are mechanically disconnected from the backup mechanism (the first cable pulley 5, the backup cables 6 and the second cable pulley 7). In this normal SBW mode, a steering torque applied to the steering wheel 1 by the driver is transmitted to the steering reaction actuator 2 via the steering column shaft 3. The applied torque and the steering angle of the steering wheel 1 are measured and the measured values are applied to the controller 15. Based on these measured values, the ECU 15a calculates a first control command value for the first motor 9 and the ECU 15b calculates a second control command value for the second motor 12.

During wheel turning control, i.e. control of the first and second motors 9 and 12 to turn the steered wheels, the first and second control command values are output by the ECUs 15a and 15b and applied to the first motor 9 and the second motor 12, respectively. The first motor 9 then generates and applies a first wheel turning torque, corresponding to the first control command value, to the first pinion shaft 8 provided at one end of the steering rack 10b of the steering rack and pinion gear mechanism 10. Simultaneously, the second motor 12 generates and applies a second wheel turning torque, corresponding to the second control command value, to the second pinion shaft 11 provided at one end of the steering rack 10b of the steering rack and pinion gear mechanism 10.

In other words, the first and second motors 9 and 12 each apply a wheel turning torque to the steering rack 10b, based on the first and second control command values calculated by the controller 15 based on the operation of the steering wheel 1, thereby to turn the steered wheels 14R and 14L through a desired angle. It will be understood that the wheel turning torques applied by the first and second motors 9 and 12 may be the same or different in value, depending on operating conditions.

The system of FIG. 1 is additionally adapted to provide steering reaction control whereby the steering reaction motor 2 applies a steering reaction torque to the steering wheel 1 via the steering column shaft 3 of the steering portion in order to feedback road surface information relating to contact between the vehicle tires and the road surface.

During such steering reaction control, a road surface reaction force generated when the steered wheels 14R and 14L are turned is determined by the controller 15 based on a parameter of the second motor 12. The term "parameter" as used herein is meant as an operating value of the second motor 12 corresponding to the wheel turning torque applied to the steering portion thereby. In the illustrated embodiment, for example, the driving current of the second motor 12, i.e. the electric current required by the second motor 12 to turn the steered wheels 14R and 14L through the desired angle, is used to calculate the road surface reaction force. Alternatively, or in addition, the wheel turning torque can be used.

The ECU 15c in the controller 15 then computes a steering reaction command value corresponding to the calculated road surface reaction force and applies the steering reaction command value to the steering reaction motor 2.

In response to the steering reaction command value, the steering reaction motor 2 applies a steering reaction torque corresponding thereto to the steering wheel 1. In this manner, the driver is provided with a contact feeling through the steering wheel 1.

It will be appreciated from the foregoing that the steering system is provided with two motors, i.e. the first motor 9 and the second motor 12, for applying the wheel turning torque to the steering rack 10 thereby to turn the steered wheels 14R and 14L through a desired steering angle. In the event of a failure of one of the motors 9 and 12, the SBW system enters the so-called partial failure mode. In the partial failure mode, the fully functioning motor is used to continue normal wheel turning control and steering reaction control. For example, if the second motor 12 sustains a problem or otherwise becomes undrivable, the ECU 15c is arranged to compute the steering reaction command value based on the driving current of the first motor 9 in order to control the steering reaction motor 2. This ensures that the steering system is required to switch to the backup mode less frequently.

To reiterate, while the steering system is working normally, i.e. in the normal SBW operation mode, the clutch 4 is disengaged so as to create an open status and steering reaction control of the steering reaction motor 2 and wheel turning control of the first and second motors 9 and 12 are executed as normal SBW control. The first pinion shaft 8, on which the first motor 9 is provided, forms a first torque transmission path for transmitting the wheel turning torque from first motor 9 to the turning unit or steered portion (i.e. the steering rack 10b), while the second pinion shaft 11, on which the second motor 12 is provided, forms a second torque transmission path for transmitting the wheel turning torque from the second motor 12 to the turning unit. It will be understood that the first and second torque transmission paths are in parallel with each other and are mechanically connected only through the turning unit itself.

Thus, because the driver operating unit (steering portion) and the turning unit (steered portion) are not linked mechanically during normal SBW operation, i.e. when the clutch 4 is disengaged, the wheel turning torques for turning the steered wheels 14R and 14L are generated by the first and second motors 9 and 12, based on the first and second control command values calculated by the ECUs 15a and 15b in the controller 15, and the steering reaction torque is generated by the steering reaction motor 2 based on the steering reaction command value calculated by the ECU 15c.

On the other hand, during a backup mode of the steering system, for example where the steering system has sustained a problem that disables normal wheel turning control and steering reaction control, the clutch 4 is engaged thereby to connect the backup mechanism to the driver operating unit (steering portion) so as to transmit torque from the steering wheel 1 to the steered wheels 14R and 14L.

Specifically, when the clutch 4 is engaged, the steering torque input to the steering wheel 1 by the driver is transmitted to the turning unit (steered portion) via the steering column shaft 3, the clutch 4, the first cable pulley 5, the backup cables 6, the second cable pulley 7 and the first pinion shaft 8 that forms the first torque transmission path. The cable column (e.g., the first cable pulley 5, the backup cables 6 and the second cable pulley 7) is adopted as a backup mechanism that assures steering performance by mechanically linking the driver operating unit (steering portion) to the turning unit (steered portion) when the clutch 4 is engaged and can usually be distributed freely by bypassing minor obstacles even in locations where a conventional steering column shaft, such as the steering column shaft 3, cannot be used.

Furthermore, in the backup mode, if at least one of the steering reaction motor 2, the first motor 9 and the second motor 12 is working normally, one or more of the functional motors is used as an assisting motor in order to carry out electric power steering control.

As described above, the steering reaction torque applied to the steering wheel 1 by the steering reaction motor 2 via the steering column shaft 3 is calculated based only on the operating parameter, for example the driving current, of either the first motor 9, which applies the wheel turning torque to the steering rack 10b via the first torque transmission path, or the second motor 12, which applies the wheel turning torque to the steering rack 10b via the second torque transmission path. More specifically, in the normal SBW operation mode, the steering reaction command value for controlling the steering reaction motor 2 thereby to apply the steering reaction torque to the driver operating unit (steering portion) is calculated by the ECU 15c of the controller 15 based only on the driving current of the second motor 12 without involving the second pinion shaft 8. However, in the so-called partial failure mode, if the second motor 12 is not functioning properly, then the steering reaction command value for controlling the steering reaction motor 2 thereby to apply the steering reaction torque to the driver operating unit (steering portion) is calculated by the ECU 15c of the controller 15 based only on the driving current of the first motor 9.

Because the first pinion shaft 8 is directly linked to the backup mechanism, any friction torque and/or inertia torque generated within the backup mechanism, i.e. within the clutch 4, the first cable pulley 5, the backup cables 6 or the second cable pulley 7, is transmitted directly to the first motor 9 via the first pinion shaft 8, even in the normal SBW operation mode when the clutch 4 is disengaged.

In contrast, the second motor 12 is not directly connected to the backup mechanism and, consequently, any such friction torque transmitted to the first pinion shaft 8 from the backup mechanism is attenuated and absorbed by components such as the steering rack 10b and the retainers 10c before it is input to the second pinion shaft 11 via the steering rack 10b.

It can be seen, therefore, that the driving current of the second motor 12, which is not directly connected to the backup mechanism, is less likely to be affected by an external disturbance (for example, friction torque or inertia torque) within the backup mechanism than the driving current of the first motor 9 to which the backup mechanism is directly connected.

As a result, the effect of any friction generated within the backup mechanism, and particularly within the clutch 4, can be reduced or substantially eliminated, thereby permitting the road surface reaction force to be estimated more accurately. In this manner, the effect of torque fluctuations can be suppressed, by suppressing the effect of friction of the backup mechanism, such that any unpleasant sensation which could be created for the driver can be reduced.

Figure 3:
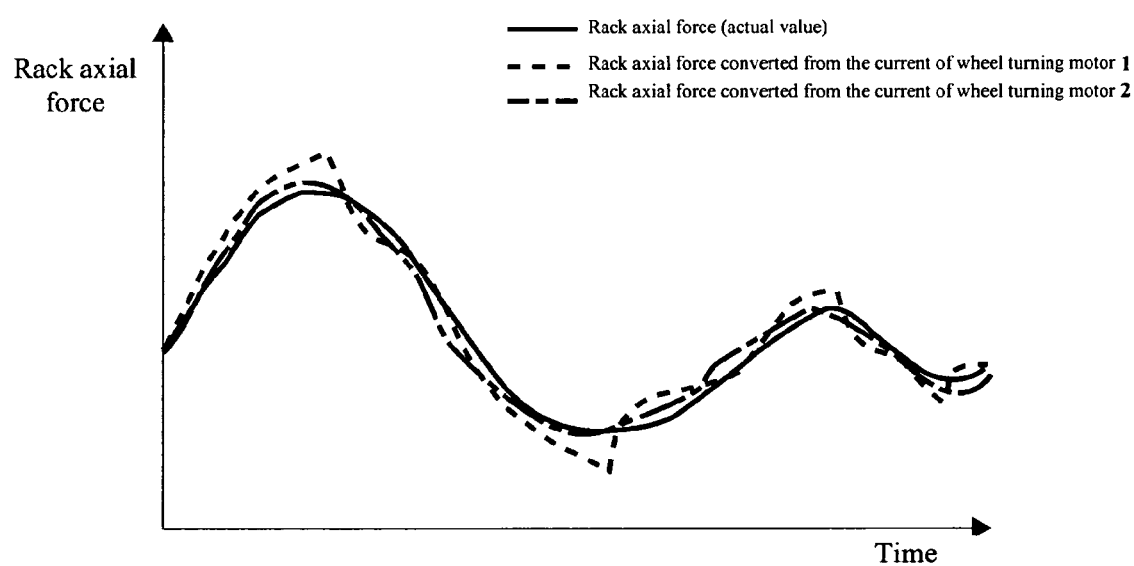
FIG. 3 is a graph showing comparisons of a steering rack axial force characteristic based on actual values, a steering rack axial force characteristic converted from the driving current of a first wheel turning motor, and a steering rack axial force characteristic converted from the driving current of a second wheel turning motor.

Referring next to FIG. 3, this illustrates a comparative graph of steering rack axial force characteristics. It can be seen that an axial force characteristic that is converted from the driving current of the first motor 9 and shown by the dashed line in FIG. 3 shows significant fluctuations and rapid changes in the axial force, due to the friction torque generated within the backup mechanism, when compared with the actual value characteristic of the axial force of the steering rack 10b which is shown by the solid line in FIG. 3.

On the other hand, an axial force characteristic that is converted from the driving current of the second motor 12 and shown by the chained line in FIG. 3 is significantly less affected by the friction torque within the backup mechanism and shows a significantly smoother characteristic that approximately matches the actual value characteristic of the steering rack axial force.

Thus, by using the parameter, i.e. the driving current, of only the second motor 12 in order to calculate the steering reaction command value for steering reaction control, the effect of friction within the backup mechanism is reduced, so that fluctuations in the steering reaction torque applied by steering reaction motor 2 are suppressed, thereby generating a more pleasant feeling for the driver.

It will be understood by the skilled person that the first and second motors 9 and 12 can be replaced by other forms of wheel turning actuators, for example hydraulic actuators. Such an arrangement, while functional, may be less desirable since a hydraulic sensor may be required in order to obtain a value equivalent to the driving current or road surface reaction torque and, in addition, responsiveness of the system may be reduced when controlling a small wheel turning angle.

In the illustrated example, on the other hand, because the wheel turning actuators comprise the first and second motors 9 and 12, the driving current of each motor may be used as a value equivalent to the driving torque for estimating the road surface reaction torque and thus highly accurate steering reaction control can be executed while using a simple configuration which does not require a separate sensor.

In the illustrated embodiment, it will be understood that the turning unit or steered portion includes the steering rack 10b of the steering rack and pinion gear mechanism 10 and that the first pinion shaft 8 is provided close to one end of the steering rack 10b while the second pinion shaft 11 is provided, in parallel with the first pinion shaft 8, close to the opposite end of the steering rack 10b.

However, if the first and second motors 9 and 12 were installed on a common pinion shaft, for example, the number of components between the two motors would be so small that it would be extremely difficult to attenuate or absorb friction torque from the backup mechanism.

In contrast, because the first and second motors 9 and 12 are provided on the first pinion shaft 8 and the second pinion shaft 9, respectively, which are installed in parallel and close to opposite end parts of the steering rack 10b, any friction torque generated within the backup mechanism that is transmitted to the first motor 9 can be attenuated and/or absorbed by components such as the steering rack 10b and the retainers 10c and 10c, before being transmitted to the second motor 12.

As described above, in the illustrated embodiment, in the event of a failure of the second motor 12, the steering reaction motor 2 generates a steering reaction torque based on a steering reaction command value calculated from the driving current of the first motor 9. Consequently, in such a partial failure mode, while smoothness of the applied steering reaction torque may be lost, steering reaction control can be continued.

On the other hand, if the steering reaction control were to be carried out based on the driving current from the second motor 12 under all circumstances, a failure of the second motor 12 fails would result in a situation whereby SBW control would be stopped and the backup mode entered.

The use of a backup mechanism including a cable column, such as that described with respect to the illustrated embodiment, is advantageous compared to backup system having only a clutch since the cable column can be routed optimally through the vehicle between the driver operating unit (steering portion) and the turning unit (steered portion), unlike a rigid column shaft. A disadvantage of such a cable column arrangement, however, is that because the backup cable is wound around a guiding groove on the pulleys 5 and 7 to transmit the steering torque from the driver operating unit (steering portion) to the turning unit (steered portion), a tight winding state and a loose winding state are created such that a higher degree of frictional torque fluctuation may occur within the backup.

According to the illustrated embodiment, however, such fluctuations in the steering reaction torque can be suppressed, despite the steering system comprising a backup mechanism that is subject to a relatively high frictional torque, owing to the fact that the parameter on which the steering reaction torque is calculated is derived from a wheel turning actuator which is connected to the steered portion via a different torque transmission path from that of the backup mechanism and, furthermore, is mechanically connected to the backup mechanism through the steered portion itself.

Figure 4:
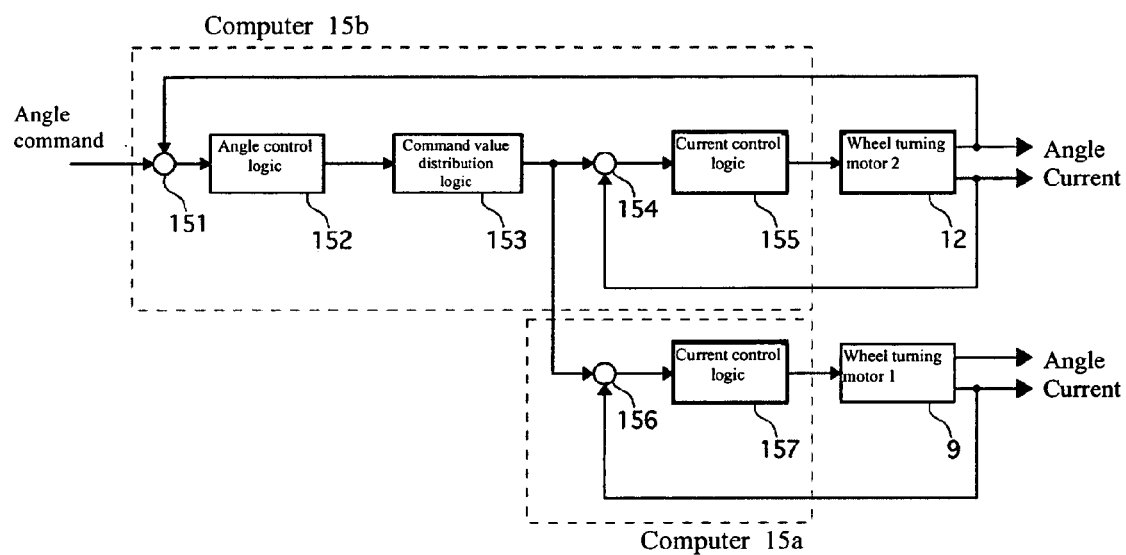
FIG. 4 is a control block diagram of a computer for use with the steer-by-wire system of FIG. 1 in accordance with the illustrated embodiment of the present invention.

Referring next to FIG. 4, this is a block diagram of part of the controller 15 suitable for use in the embodiment of FIG. 1. In addition to the steering reaction control described above, as seen in FIG. 4, control based on angle information relating to the second motor 12 is adopted during wheel turning control.

In the controller 15 of FIG. 4, the ECUs 15a and 15b which are arranged to control the first and second motors 9 and 12, respectively, compute current command values based on angle information relating to the second motor 12 so as to obtain an angle command value that corresponds to a given operating state of the driver operating unit (e.g. the steering angle and torque applied to the steering wheel 1) and to apply the result of this calculation to the first and second motors 9 and 12 in order to drive them accordingly.

The ECU 15b comprises a first differential unit 151 which is connected to the input of an angle control logic unit 152. An output of the angle control logic unit 152 is connected to an input of a command value distribution logic unit 153 whose output is connected to a second differential unit 154. An output of the second differential unit 154 is connected to an input of a first current control logic unit 155 whose output is connected to the second motor 12.

The ECU 15a comprises a third differential unit 156, and input of which is connected to the output of the command value distribution logic unit 153 in ECU 15b. An output of the third differential unit 156 is connected to an input of a second current control logic unit 157, the output of which is connected to the first motor 9.

Operation of the controller 15 shown in FIG. 4 will now be described.

The first differential unit 151 obtains an angle command as the difference between a target steering angle, corresponding to the given operating state of the driver operating unit (steering portion), and an angle value detected from the second motor 12.

The angle control logic unit 152 takes the angle difference from the first differential unit 151 as an input and obtains a current command value, which increases as the angle difference increases, based on an angle control logic.

The command value distribution logic unit 153 takes the angle control command value from the angle control logic unit 152 as an input and outputs to the second differential unit 154 and the third differential unit 156 current command values which are obtained according to a command value distribution logic.

The second differential unit 154 obtains a current difference between the current command value generated by the command value distribution logic unit 153 and the detected current value of the second motor 12.

The current control logic unit 155 takes the current difference from the second differential unit 154 as a input, obtains a control current for the second motor 12 based on a current control logic and outputs the obtained control current to the second motor 12.

In the ECU 15a, the third differential unit 156 obtains the current difference between the current command value generated by the command value distribution logic unit 153 and the detected current value of the first motor 9.

The current control logic unit 157 takes the current difference from the third differential unit 156 as an input, obtains a control command value for the first motor 9 based on a current control logic and outputs the obtained control current to the first motor 9.

In other words, the arrangement of the controller 15 is such that the first differential unit 151 utilizes angle information pertaining to first wheel turning motor 12, the angle control logic unit 152 and the command value distribution logic unit 153 are provided only within ECU 15b and only the second motor 12 is used until the overall current command value is determined and distributed.

For the sake of clarity, it is reiterated that the controller 15 described above with reference to FIG. 4 may be used in the steering system of FIG. 1 and further description of the configuration of the steering system is therefore not provided.

In use, the ECU 15*b* and the ECU 15*a* compute a current command value based on angle information relating to the second motor 12 so as to obtain an angle command value that corresponds to a given operating state of the driver operating unit (steering portion) and distribute this to the first and second motors 9 and 12, respectively, in order to drive them accordingly.

As a result, angle information that is affected by friction of the first motor 9 is never used to control the second motor 9 and therefore fluctuation of the driving currents of the motors 9 and 12 due to fluctuation in friction is suppressed. As a result, smooth wheel turning control can be realized. Here, because the other functions are identical to those of described with reference to FIG. 1, explanation thereof will be omitted.

While a steering system embodying the invention has been described with respect to the specific arrangements of FIGS. 1 to 4, the invention is not restricted to these examples and various modifications and additions may be made thereto without deviating from the scope of the invention defined within the claims.

For example, although the illustrated embodiments describe generating a steering reaction command value based on the driving current of the second motor 12 in order to control the driving of the steering reaction motor 2, it is envisaged that an electric linear motors, hydraulic motors or hydraulic cylinders, for example, can be used for the wheel turning actuators. Furthermore, when such wheel turning actuators are used and a torque sensor is installed, the torque sensor value may be used as a driving torque equivalent value.

The present invention is applicable to a steering system in which steering reaction control for applying a reaction torque to the driver operating unit (steering portion) is based on a parameter of a wheel turning actuator which is arranged to apply a wheel turning torque to the steered portion via a torque transmission path which is different from a torque transmission path to which the backup mechanism, or the clutch of the backup mechanism, is connected.

Moreover, the present invention is intended to cover any steering reaction control means wherein the steering reaction actuator 2 is controlled based on the wheel turning torque of the second motor or wheel turning actuator 12, which applies a wheel turning torque via the first pinion shaft 11 whose torque transmission path does not involve the clutch 4, without involving the second pinion shaft 8 provided on the same torque transmission path as the clutch 4.

Furthermore, the present invention is also applicable in a steer-by-wire system that involves only a clutch without a cable column. In addition, although a case involving two wheel turning actuators for applying wheel turning torques to the steered portion has been described, the present invention is not restricted to them and it can also be applied to a case involving one wheel turning actuator. Thus, the present invention can be applied to any steer-by-wire system equipped with a clutch for engaging/disengaging the steering portion with/from the steered portion, a steering reaction actuator for applying a steering reaction force to the steering portion and one or more wheel turning actuators for applying a wheel turning torque to the steered portion.

The preceding description has been presented only to illustrate and describe possible embodiments of the claimed invention. It is not intended to be exhaustive or to limit the invention to any precise form disclosed. It will be understood by those skilled in the art that various changes may be made and equivalents may be substituted for elements thereof without departing from the spirit and scope of the invention. Therefore, it is intended that the invention not be limited to the particular embodiments disclosed as the best mode contemplated for carrying out this invention but that the invention can widely be adapted to steering systems formed with various layouts and will include all embodiments falling within the scope of the appended claims.

What is claimed is:

1. A steering apparatus for a vehicle having at least one steered wheel comprising:
   a driver operating unit;
   a turning unit including a first shaft, a second shaft, and a steering mechanism disposed between the first and second shafts;
   a backup mechanism selectively operable to mechanically connect the driver operating unit to the turning unit via the first shaft to transmit a mechanical input torque from the driver operating unit to the turning unit when the driver operating unit and the turning unit are mechanically connected, the backup mechanism being arranged with respect to the driver operating unit and the turning unit such that a mechanical input torque from the driver operating unit cannot be transmitted to the turning unit via the second shaft;
   a steering reaction actuator operable to apply a steering reaction torque to the driver operating unit;
   a first wheel turning actuator mechanically connected to the backup mechanism and operable to apply a wheel turning torque to the turning unit via the first shaft; and
   a second wheel turning actuator laterally spaced from the first wheel turning actuator along the turning unit with respect to a lateral direction of the vehicle and operable to apply a wheel turning torque to the turning unit via the second shaft which is parallel to and laterally spaced from the first shaft along the turning unit with respect to the lateral direction of the vehicle, with a non-mechanical torque command being non-mechanically transmitted to the second wheel turning actuator,
   the second wheel turning actuator being mechanically connected to the backup mechanism only via the second shaft through the steering mechanism and being configured to provide an operating parameter that is less affected by an external disturbance within the backup mechanism than an operating parameter provided by the first wheel turning actuator which is mechanically connected to the backup mechanism; and
   a controller operable to control the first and second wheel turning actuators and the steering reaction actuator, the controller being configured to control the steering reaction actuator based on the operating parameter of the second wheel turning actuator and not based on the operating parameter of the first wheel turning actuator while at least the second wheel turning actuator is determined to be operating normally,
   the controller being further configured to compute a current command value based on angle information pertaining to the second wheel turning actuator, and not based on angle information pertaining to the first wheel turning actuator, so as to obtain an angle command value corresponding to an operating state of the driver operating unit and to drive the first and second wheel turning actuators accordingly, the second wheel turning actuator being arranged relative to the first wheel turning actuator such that the current command value based on angle information pertaining to the second wheel turning actuator is less affected by an external disturbance within the backup mechanism than a current command value based on angle information pertaining to the first wheel turning actuator which is mechanically connected to the backup mechanism.

2. The steering apparatus according to claim 1 wherein the controller is configured to control the steering reaction actuator based on a value corresponding to the wheel turning torque that the second wheel turning actuator applies to the turning unit via the second shaft.

3. The steering apparatus according to claim 1, wherein the first and second wheel turning actuators comprise first and second wheel turning motors, respectively, with the first wheel turning motor being operable to apply a first wheel turning torque to the turning unit via the first shaft, the second wheel turning motor being operable to apply a second wheel turning torque to the turning unit via the second shaft, and the controller being configured to control the steering reaction actuator based on a driving current of the second wheel turning motor.

4. The steering apparatus according to claim 1, wherein the turning unit comprises a steering rack, a first pinion gear and a second pinion gear;
the first shaft comprises at least a part of a pinion shaft of the first pinion gear connected at least near a first end part of the steering rack thereof; and
the second shaft comprises at least a part of a pinion shaft of the second pinion gear connected at least near a second end part the steering rack.

5. The steering apparatus according to claim 1, wherein the controller is further configured to control the steering reaction actuator based on the wheel turning torque of the first wheel turning actuator when the second wheel turning actuator malfunctions or fails.

6. The steering apparatus according to claim 1, wherein the backup mechanism includes a clutch operable to connect and disconnect the driver operating unit to and from the turning unit, and a cable column connected between the clutch and the turning unit.

7. A vehicle equipped with the steering apparatus according to claim 1.

8. A steering apparatus comprising:
steering input means for receiving a steering operation from a driver;
turning means for turning at least one steered wheel, the turning means including a first transmission path, a second transmission path, and a steering mechanism disposed between the first and second transmission paths;
first torque applying means for applying a first wheel turning torque to the turning means via the first transmission path;
second torque applying means for applying a second wheel turning torque to the turning means via the second transmission path which is parallel to and laterally spaced from the first transmission path along the turning means with respect to a lateral direction of a vehicle having the steering apparatus, the second torque applying means being laterally spaced from the first torque applying means along the turning means with respect to the lateral direction of the vehicle;
backup means for mechanically connecting the steering input means to the turning means via the first transmission path to mechanically transmit a mechanical input torque from the steering input means to the turning means when the steering input means and the turning means are mechanically connected by the backup means, with a non-mechanical torque command being non-mechanically transmitted to the second second torque applying means when the steering input means and the turning means are not mechanically connected by the backup means, and with the first torque applying means being mechanically connected to the backup means, and with the second torque applying means being mechanically connected to the backup means only via the second transmission path through the steering mechanism and being configured to provide an operating parameter that is less affected by an external disturbance within the backup means than an operating parameter provided by the first torque applying means which is mechanically connected to the backup means,
the backup means beings arranged with respect to the steering input means and the turning means such that the mechanical input torque from the steering input means cannot be transmitted to the turning means via the second transmission path;
steering reaction means for applying a steering reaction torque to the steering input means; and
control means for controlling the steering reaction means based on the operating parameter of the second torque applying means and not based on the operating parameter of the first torque applying means
the control means being further configured to compute a current command value based on angle information pertaining to the second torque applying means, and not based on angle information pertaining to the first torque applying means, so as to obtain an angle command value corresponding to an operating state of the steering input means and to drive the first and second torque applying means accordingly, the second torque applying means being arranged relative to the first torque applying means such that the current command value based on angle information pertaining to the second torque applying means is less affected by an external disturbance within the backup means than a current command value based on angle information pertaining to the first torque applying means which is mechanically connected to the backup means.

9. The steering apparatus according to claim 8, wherein the control means is configured to control the steering reaction means based on the second wheel turning torque applied to the turning means by the second torque applying means.

10. A vehicle equipped with the steering apparatus according to claim 8.

11. A steering controller comprising:
a first mode control section configured to selectively apply a wheel turning torque to a turning unit for turning at least one wheel via a first transmission path and apply a steering reaction torque to a driver operating unit based on the wheel turning torque transmitted to the turning unit via the first transmission path and not based on a mechanical input torque transmitted to the turning unit via a second transmission path, with a non-mechanical torque command being non-mechanically transmitted to the first transmission path, the turning unit including the first transmission path, the second transmission path, and a steering mechanism disposed between the first and second transmission paths; and
a second mode control section configured to selectively control a clutch disposed in the second transmission path which is parallel to and laterally spaced from the first transmission path along the turning unit with respect to a lateral direction of a vehicle having the steering controller, the second transmission path being formed between the driver operating unit and the turning unit such that the mechanical input torque from the driver operating unit cannot be transmitted to the turning unit via the first transmission path, the clutch disposed so as to selectively connect and disconnect mechanically the driver operating unit to the turning unit through the second transmission path such that the mechanical input torque of the driver operating unit is transmitted to the turning unit via the second transmission path while the driver operating unit and the turning unit are mechanically connected, the first transmission path being mechanically connected to the clutch only via the first transmission path through the steering mechanism such that a measurement of the wheel turning torque transmitted to the turning unit via the first transmission path is less affected by an external disturbance within the clutch than a measurement of the mechanical input torque transmitted to the turning unit via the second transmission path which is mechanically connected to the clutch, and the first mode control section being further configured to compute a current command value based on angle information pertaining to the first transmission path, and not based on angle information pertaining to the second transmission path, so as to obtain an angle command value corresponding to an operating state of the driver operating unit and to transfer torque to the turning unit via the first and second transmission paths accordingly, the first transmission path being arranged relative to the second transmission path such that the current command value based on angle information pertaining to the first transmission path is less affected by an external disturbance within the clutch than a current command value based on angle information pertaining to the second transmission path which is mechanically connected to the backup mechanism.

12. A vehicle equipped with the steering controller according to claim 11.

13. A vehicle steering system controller comprising:

a first wheel turning actuator control section configured to control a first wheel turning actuator so as to apply a first wheel turning torque to a turning unit via a first torque transmission path in which a backup mechanism is selectively operable to mechanically connect a driver operating unit to the turning unit, the first wheel turning actuator being mechanically connected to the backup mechanism;

a second wheel turning actuator control section configured to control a second wheel turning actuator laterally spaced from the first wheel turning actuator along the turning unit with respect to a lateral direction of a vehicle having the controller so as to apply a second wheel turning torque to the turning unit via a second torque transmission path which is parallel to and laterally spaced from the first transmission path along the turning unit with respect to the lateral direction of the vehicle, with a non-mechanical torque command being non-mechanically transmitted to the second wheel turning actuator, the turning unit including the first torque transmission path, the second torque transmission path, and a steering mechanism disposed between the first and second torque transmission paths, and the backup mechanism being arranged with respect to the driver operating unit and the turning unit such that a mechanical input torque from the driver operating unit cannot be transmitted to the turning unit via the second torque transmission path, the second wheel turning actuator being mechanically connected to the backup mechanism only via the second torque transmission path through the steering mechanism and being configured to provide an operating parameter based on the second wheel turning torque that is less affected by an external disturbance within the backup mechanism than an operating parameter provided by the first wheel turning actuator based on the first wheel turning torque which is mechanically connected to the backup mechanism; and a steering reaction actuator control section configured to control a steering reaction actuator of the driver operating unit so as to apply a steering reaction torque to the driver operating unit based only on the operating parameter based on the second wheel turning torque applied to the turning unit by the second wheel turning actuator and not based on the operating parameter based on the first wheel turning torque applied to the turning unit by the first wheel turning actuator while at least the second wheel turning actuator is determined to be operating normally, the steering reaction actuator control section being further configured to compute a current command value based on angle information pertaining to the second wheel turning actuator, and not based on angle information pertaining to the first wheel turning actuator, so as to obtain an angle command value corresponding to an operating state of the driver operating unit and to drive the first and second wheel turning actuators accordingly, the second wheel turning actuator being arranged relative to the first wheel turning actuator such that the current command value is less affected by an external disturbance within the backup mechanism than a current command value based on angle information pertaining to the first wheel turning actuator which is mechanically connected to the backup mechanism.

14. The vehicle steering system controller according to claim 13, wherein the steering reaction actuator control section is further configured to control the steering reaction actuator to apply the steering reaction torque to the driver operating unit based on the first wheel turning torque applied to the turning unit by the first wheel turning actuator when the second wheel turning actuator is determined to be malfunctioning.

15. A vehicle equipped with the steering apparatus according to claim 13.

16. A steering method comprising:

applying a wheel turning torque to a turning unit using a first wheel turning actuator based on a driver input to a driver operating unit via a first transmission path including a first shaft;

applying a wheel turning torque to the turning unit using a second wheel turning actuator laterally spaced from the first wheel turning actuator along the turning unit with respect to a lateral direction of a vehicle in which the steering method is performed to apply a wheel turning torque to the turning unit via a second transmission path including a second shaft which is parallel to and laterally spaced from the first shaft along the turning unit with respect to the lateral direction of the vehicle, with a non-mechanical torque command being non-mechanically transmitted to the second wheel turning actuator, and with the turning unit including the first shaft, the second shaft, and a steering mechanism disposed between the first and second shafts;

mechanically connecting the driver operating unit to the turning unit via a backup mechanism, when at least one of the driver operating unit and the turning unit malfunctions, to transmit a mechanical input torque from the driver operating unit to the turning unit via the first transmission path such that the first wheel turning actuator is mechanically connected to the backup mechanism, the backup mechanism being arranged with respect to the driver operating unit and the turning unit such that the mechanical input torque from the driver operating unit cannot be transmitted to the turning unit via the second shaft, applying a steering reaction torque to the driver operating unit based on a measurement of the wheel turning torque applied using the second wheel turning actuator and not based on a measurement of the wheel turning torque applied using the first wheel turning actuator, the second wheel turning actuator being mechanically connected to the backup mechanism only via the second shaft through the steering mechanism such that the measurement of the wheel turning torque applied using the second wheel turning actuator is less affected by an external disturbance within the backup mechanism than the measurement of the wheel turning torque applied using the second wheel turning actuator which is mechanically connected to the backup mechanism; and computing a current command value based on angle information pertaining to the second wheel turning actuator, and not based on angle information pertaining to the first wheel turning actuator, so as to obtain an angle command value corresponding to an operating state of the driver operating unit and to drive the first and second wheel turning actuators accordingly, the second wheel turning actuator being arranged relative to the first wheel turning actuator such that the current command value based on angle information pertaining to the second wheel turning actuator is less affected by an external disturbance within the backup mechanism than a current command value based on angle information pertaining to the first wheel turning actuator which is mechanically connected to the backup mechanism.

* * * * *